United States Patent
Downey (10) Patent No.: US 12,009,532 B1
(45) Date of Patent: Jun. 11, 2024

(54) MARINE BATTERY BOX AND COVER THEREFOR

(71) Applicant: Brunswick Corporation, Mettawa, IL (US)

(72) Inventor: Kevin T. Downey, Rockford, MI (US)

(73) Assignee: Brunswick Corporation, Mettawa, IL (US)

( * ) Notice: Subject to any disclaimer, the term of this patent is extended or adjusted under 35 U.S.C. 154(b) by 156 days.

(21) Appl. No.: 17/181,522

(22) Filed: Feb. 22, 2021

(51) Int. Cl.
*H01M 50/147* (2021.01)
*H01M 50/256* (2021.01)
*H01M 50/289* (2021.01)

(52) U.S. Cl.
CPC ....... *H01M 50/147* (2021.01); *H01M 50/256* (2021.01); *H01M 50/289* (2021.01); *H01M 2220/20* (2013.01)

(58) Field of Classification Search
CPC ............. H01M 50/147; H01M 50/256; H01M 50/289; H01M 2220/20
See application file for complete search history.

(56) References Cited

U.S. PATENT DOCUMENTS

| | | | |
|---|---|---|---|
| 1,480,089 A | 1/1924 | Mancha | |
| 7,573,229 B2 | 8/2009 | Arakelian | |
| 7,978,463 B1 * | 7/2011 | Haun | E04H 5/02 361/679.01 |
| 9,634,503 B2 | 4/2017 | Taga et al. | |
| 10,811,648 B2 | 10/2020 | Bende | |
| 2003/0047366 A1 | 3/2003 | Andrew et al. | |
| 2007/0024236 A1 * | 2/2007 | Arakelian | H01M 50/296 320/107 |
| 2022/0271379 A1 * | 8/2022 | Smith | H01M 50/574 |

OTHER PUBLICATIONS

Universal Power Group, Universal Power Group UPG 40790 Black Marine Smart Box, https://www.amazon.com/dp/B003BMCL4M?tag=tacklescout-20%linkCode=ogi%th=1%psc=1, website accessed Feb. 15, 2021.
Newport Vessels, Newport Vessels Trolling Motor Smart Battery Box Power Center with USB and DC Ports, Black, Medium, https://www.amazon.com/dp/B01AE2TG7G?tag=tacklescout-20%linkCode=ogi%th=1%psc=1, website accessed Feb. 15, 2021.
Minn Kota, Minn Kota 1820175 Trolling Motor Battery Power Center, Black, One Size, https://www.amazon.com/dp/B001PTHKMG?tag=tacklescout-20%linkCode=ogi%th=1%psc=1, website accessed Feb. 15, 2021.
Attwood, Attwood Standard Battery Box, https://www.amazon.com/dp/B000YS2MHW?tag=tacklescout-20%linkCode=ogi%th=1%psc=1, website accessed Feb. 15, 2021.

* cited by examiner

*Primary Examiner* — Ula C Ruddock
*Assistant Examiner* — Sarika Gupta
(74) *Attorney, Agent, or Firm* — Andrus Intellectual Property Law, LLP (57) ABSTRACT

A container for a marine battery includes a lower portion for supporting the marine battery and a cover portion over the lower portion. The cover portion and lower portion together enclose an interior space configured to hold the battery. The cover portion has a middle section and two end sections on either side of the middle section. At least one of the end sections has an access door that is movable independently of the middle section to provide access to the interior space, while the middle section remains stationary with respect to the lower portion.

20 Claims, 6 Drawing Sheets

FIG. 9 ns in the Detailed
MARINE BATTERY BOX AND COVER THEREFOR

FIELD

The present disclosure relates to containers for marine batteries.

BACKGROUND

Marine battery containers are used to hold a marine battery for transport, to protect the battery from water, and/or to hold the battery in place on a boat that does not have a battery compartment. On some containers, it is necessary to remove the cover entirely before the terminals can be accessed. On other containers, terminals are provided on the exterior of the box, sometimes with small caps just large enough to cover the terminals.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a container for a marine battery includes a lower portion configured to support the marine battery and a cover portion over the lower portion. The cover portion and lower portion together enclose an interior space configured to hold the battery. The cover portion has a middle section and two end sections on either side of the middle section. At least one of the end sections comprises an access door that is movable independently of the middle section so as to provide access to the interior space, while the middle section remains stationary with respect to the lower portion.

According to another example, a cover for a marine battery box includes a frame configured to be supported about an upper perimeter of the box and secured thereto. A middle cover section extends from a first side of the frame to second side of the frame, opposite the first side. A first access door is pivotably connected to a third side of the frame, and a second access door is pivotably connected to a fourth side of the frame, opposite the third side. When the access doors are in a closed configuration, the access doors and middle cover section are together configured to enclose an interior space between the cover and the box.

BRIEF DESCRIPTION OF THE DRAWINGS

Examples of marine battery boxes are described with reference to the following Figures. The same numbers are used throughout the Figures to reference like features and like components.

DETAILED DESCRIPTION

Figure 1:
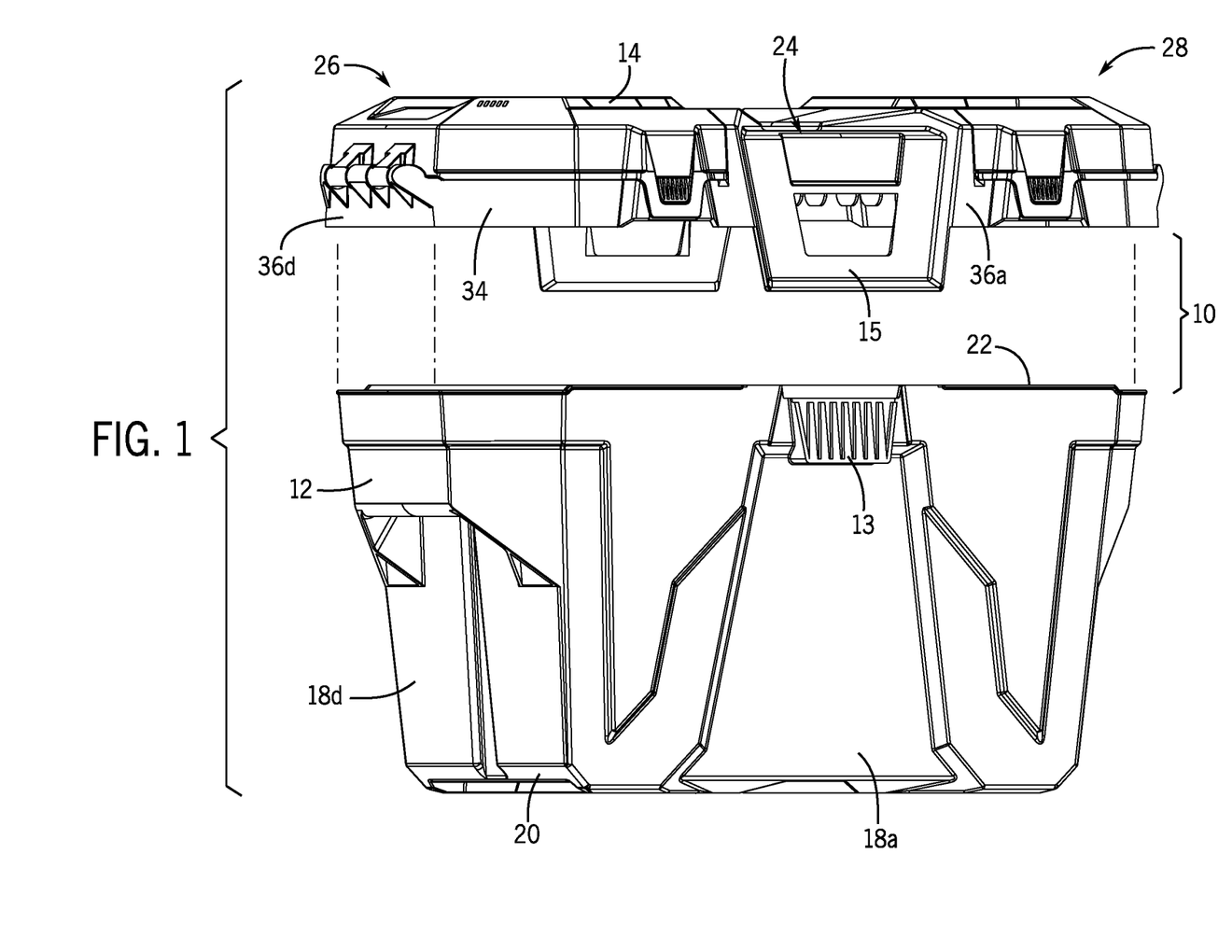
FIG. 1 is an exploded left perspective view of a container for a marine battery according to the present disclosure.
Figure 2:
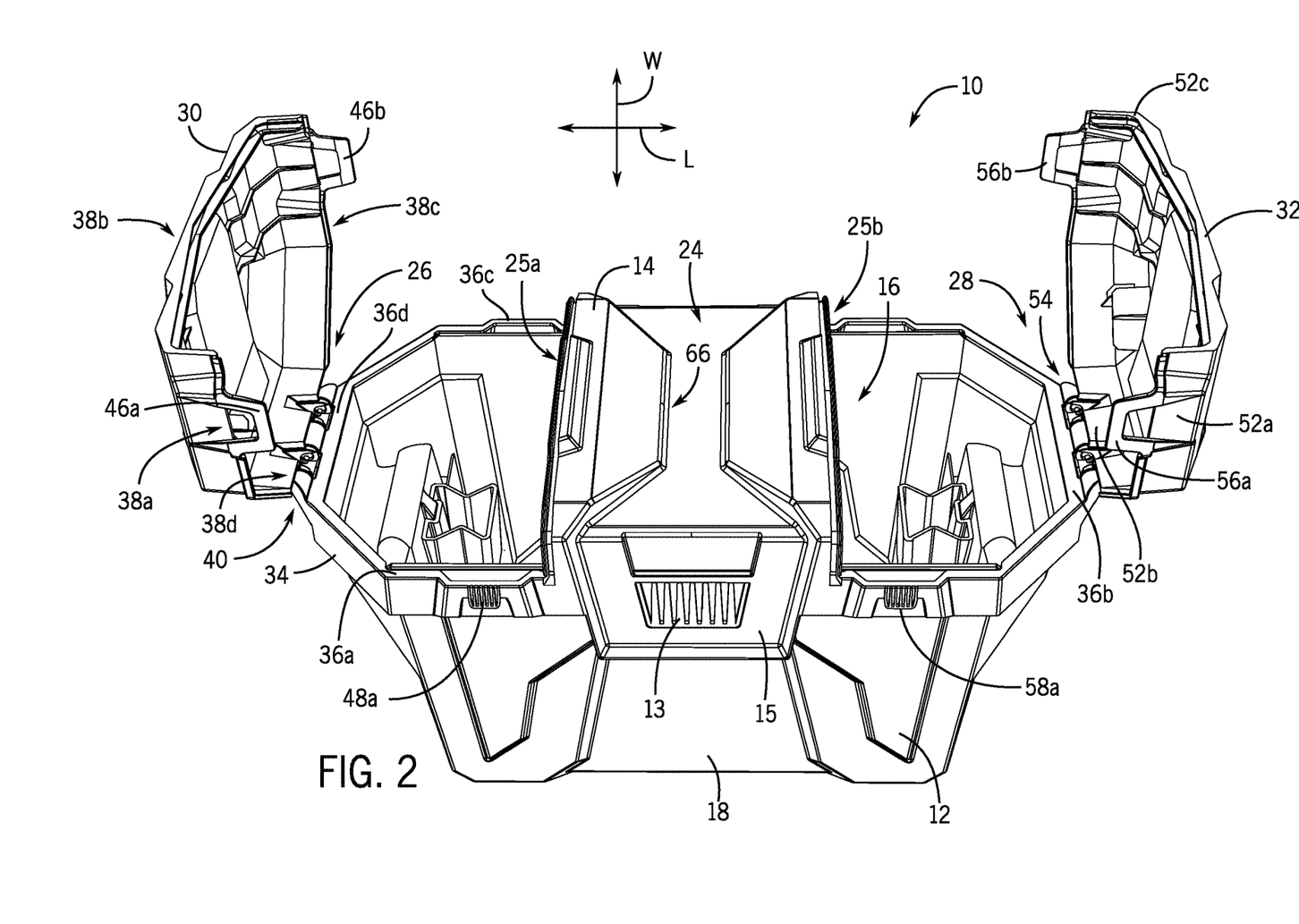
FIG. 2 is a top perspective view of the container with its two access doors in an open configuration.

FIGS. 1 and 2 show a container 10 for a marine battery according to the present disclosure. FIG. 1 shows the container 10 in an exploded view, with a lower portion 12 configured to support the marine battery being separated from a cover portion 14 configured to be situated over the lower portion 12. When the cover portion 14 is situated over the lower portion 12 (see, for example, FIG. 3), the cover portion 14 and lower portion 12 together enclose an interior space 16 configured to hold the battery (not shown). The battery can be a starting battery, a deep-cycle battery, or a dual-purpose (starting and deep-cycle) battery of any size, most typically ranging from group size 22 NF to 65. Typically, such marine batteries have terminals on the upper face of the battery, the negative terminal being at one end, and the positive terminal being at the other.

Figure 8:
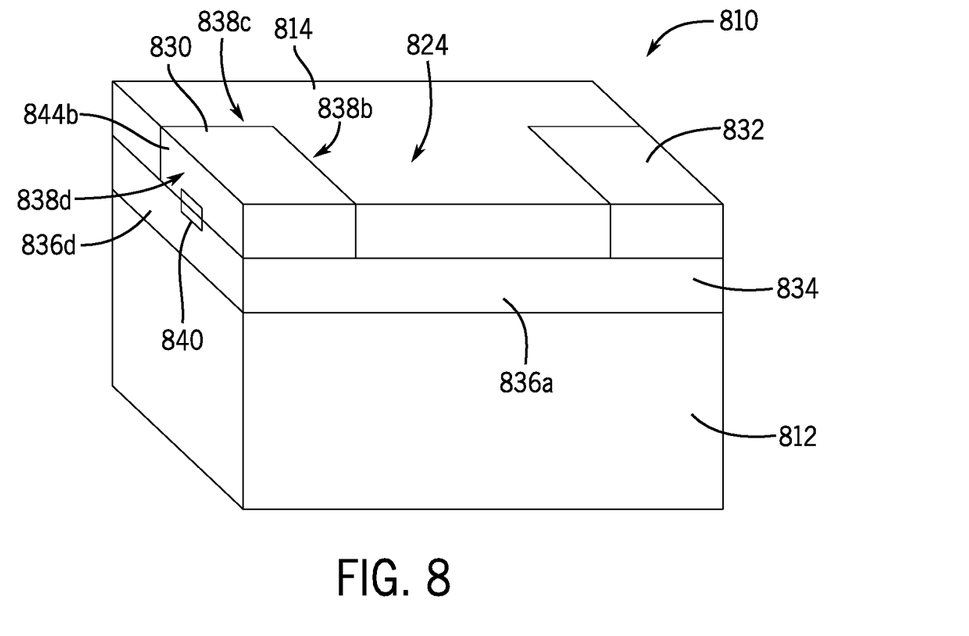
FIG. 8 shows another embodiment of a container for a marine battery, in which the access doors are smaller than in the embodiment of FIGS. 1-7.
Figure 9:
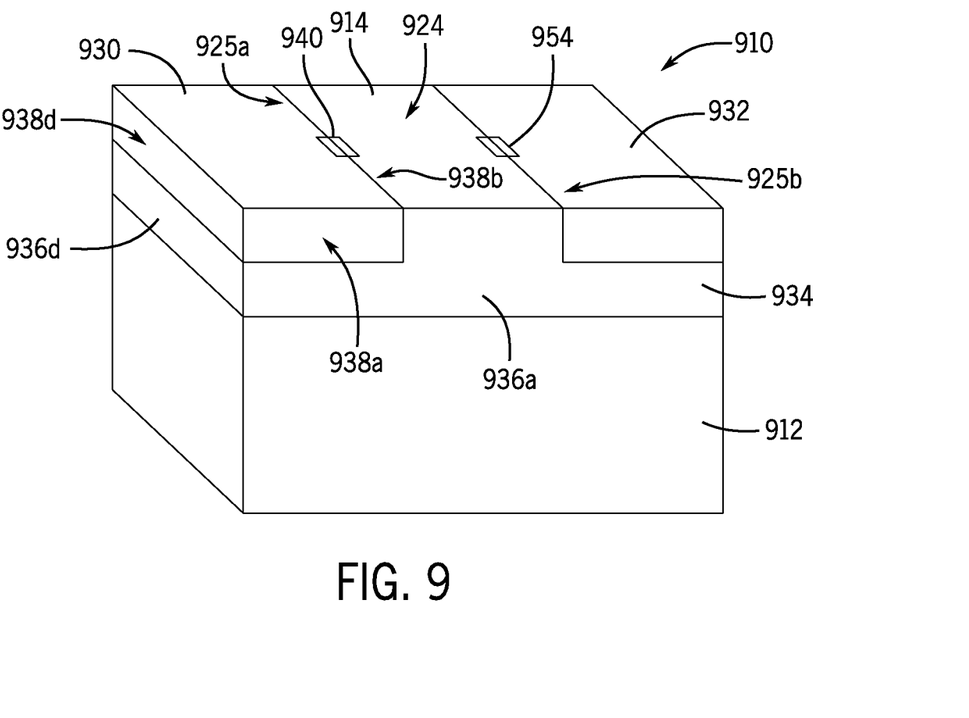
FIG. 9 shows another embodiment of a container for a marine battery, in which the access doors are hinged opposite those in the embodiment of FIGS. 1-7.

The lower portion 12 as shown here is generally in the shape of an open-ended box, with four main sides 18a-d, and a bottom 20. The four main sides 18a-d of the lower portion 12 terminate at an upper perimeter 22, about which the cover portion 14 is configured to be supported. Note that although the lower portion 12 is generally configured as a box with four main sides, the upper perimeter 22 is shaped like an elongated octagon. It should be understood that the lower portion 12 and its upper perimeter 22 could take any other shape suitable for holding a marine battery, such as a rectangular box as shown in FIGS. 8 and 9.

Figure 3:
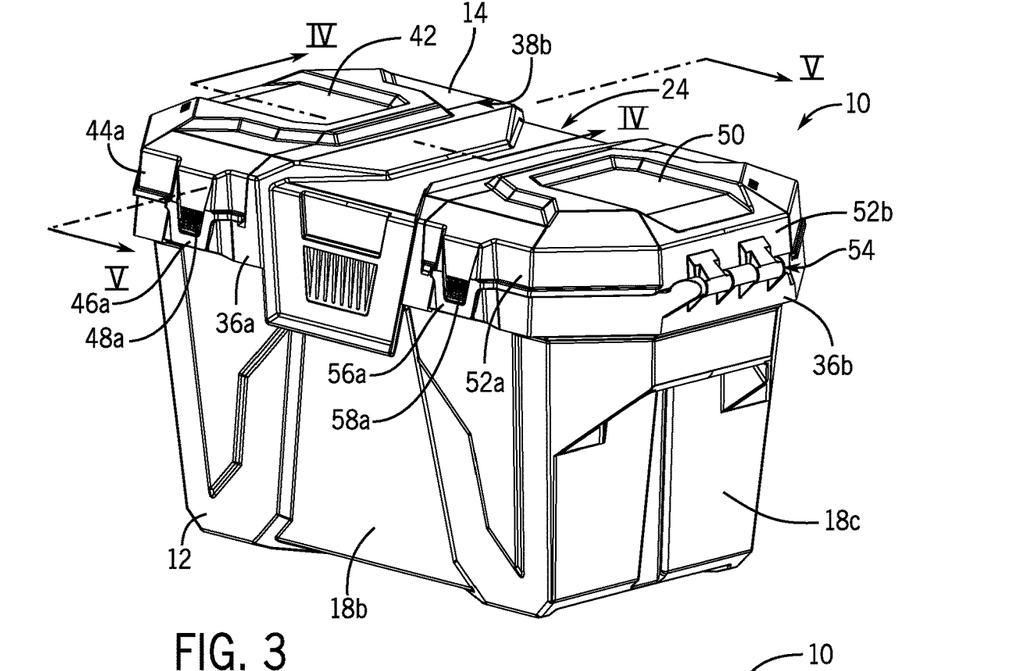
FIG. 3 is a right perspective view of the container with the access doors in a closed configuration.

As shown in FIGS. 2 and 3, the cover portion 14 is also shaped as an elongated octagon to match the upper perimeter 22 of the lower portion 12. The cover portion 14 has a middle section 24 and two end sections 26, 28 on either side of the middle section 24. Of course, if the lower portion 12 had a differently shaped upper perimeter 22, the cover portion 14 could have an appropriate corresponding shape. As shown in FIG. 2, at least one of the end sections 26, 28 comprises an access door 30, 32 that is movable independently of the middle section 24 so as to provide access to the interior space 16, while the middle section 24 remains stationary with respect to the lower portion 12.

More specifically, the cover portion 14 comprises a frame 34 configured to be supported about the upper perimeter 22 of the lower portion 12 (i.e., box) of the container 10 and secured thereto. The frame 34 has the same elongated hexagonal shape as the upper perimeter 22 of the lower portion 12, but a slightly larger footprint, such that the frame 34 can rest over the upper perimeter 22. In this example, almost the entire height of the frame 34 overlaps upper ends of the outer faces of the sides 18a-d of the lower portion 12, but in other examples, the frame 34 could only slightly overlap the upper ends of the outer faces of the sides 18a-d. This overlap protects against water intrusion when the cover portion 14 is secured on the lower portion 12. As shown in FIG. 1, the entire cover portion 14, including the middle section 24, the two end sections 26, 28, and the frame 34, is removable from the lower portion 12 of the container 10. This allows a battery to be placed inside the container 10. The cover portion 14 can be re-secured to the lower portion 12 by way of a closure on each side of the container 10, such as the tongue 13 and catch 15 closure shown here. (A similar closure is provided on the opposite side of the container 10.) Other closures or a friction fit could be used in other examples. In still another example, the frame 34 is permanently connected to the lower portion 12 of the container 10, and at least one of the access doors 30, 32 is large enough for the battery to be inserted therethrough into the interior space 16.

As shown in FIG. 2, the middle section 24 of the cover portion 14 is permanently connected to the frame 34 on opposite sides thereof. More specifically, the middle cover section 24 extends from a first side 36a of the frame 34 to second side 36c of the frame 34, opposite the first side 36a, and is permanently connected between the first and second sides 36a, 36c of the frame 34. The permanent connection can be made by co-molding the frame 34 and middle section 24 or by adhering or otherwise non-removably connecting the middle section 24 to the frame 34. A first access door 30 is pivotably connected to a third side 36d of the frame 34, and a second access door 32 is pivotably connected to a fourth side 36b of the frame 34, opposite the third side 36d. The first, second, third, and fourth sides 36a-d of the frame 34 have generally vertically oriented outer faces. However, in other examples, the sides 36a-d of the frame 34 could be angled more outwardly or more inwardly than shown herein. In the present example, the middle section 24 has a length that is about a third of a total length of the cover portion 14 (refer to length direction L). However, the middle section 24 could be longer or shorter than shown herein. For example, the length of the middle section 24 should be enough to support a tie-down strap 68 (FIG. 7) as well as interface with and support the access doors 30, 32 when closed, and can be ±20% of a third of the total length of the cover portion 14. The access doors 30, 32 each also have a length that is about a third of the total length of the cover portion 14, but the access doors 30, 32 could be longer or shorter depending on the length dimension of the middle section 24.

Each access door 30, 32 is a mirror image of the other, and for now only access door 30 will be described in greater detail, it being understood that a similar description applies to access door 32. The access door 30 has at least two sides 38a-c that are configured to separate from the frame 34 of the cover portion 14 when the access door 30 is moved to provide access to the interior space 16. A hinge 40 connects a remaining side 38d of the access door 30 to the frame, the hinge 40 allowing the at least two sides 38a-c of the access door 30 to be pivoted away from the frame 34 to provide access to the interior space 16. In the present example, the hinge 40 is located at an outer end of the cover portion 14 (i.e., away from the middle section 24); however, in other examples, the hinge could be on the side 36a or 36c of the frame 34 or on a side 25a of the middle section 24 (see, for example FIG. 9). The hinge 40 is shown as a butt hinge, but it could be a living hinge, a piano hinge, a ball grip hinge, a flexible strap, or any other suitable type of hinge. In still other examples, no hinge is provided, and the access door 30 can be lifted entirely off the frame 34 and middle section 24.

Figure 4:
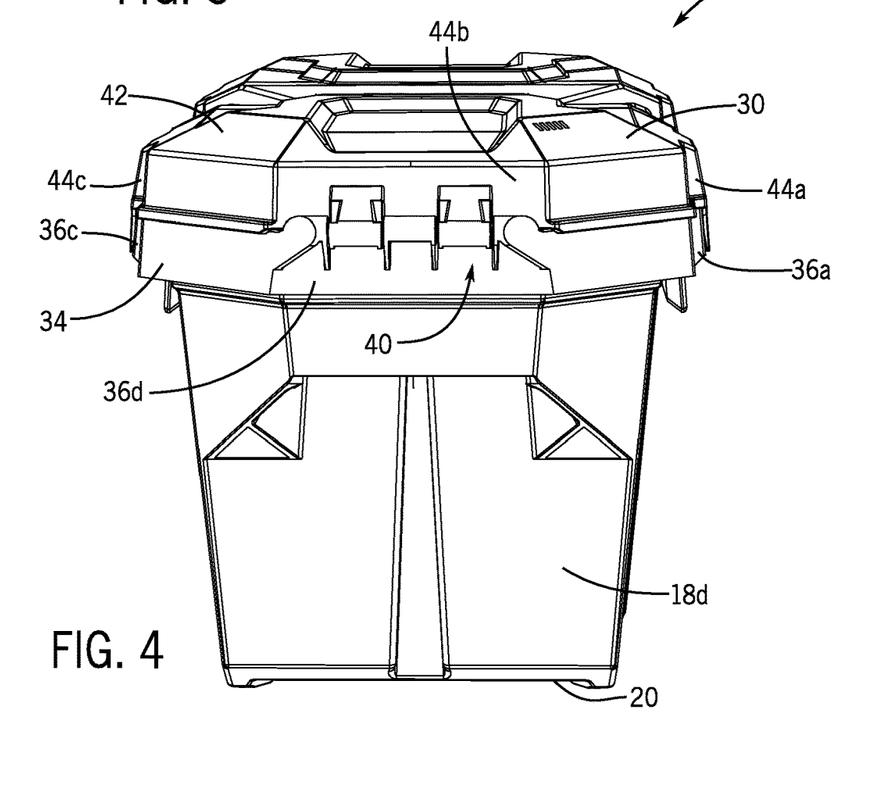
FIG. 4 shows a left side of the container.

As best shown in FIG. 4, the access door 30 has an upper side 42 and at least three sidewalls 44a-c that extend generally perpendicularly from the upper side 42 and align with the generally vertically oriented sides 36a, 36d, 36c, respectively, of the frame 34. Thus, the access door 30 extends across an entire width of the cover portion 14 (reference width direction W in FIG. 2). In other examples, the access door 30 is smaller, instead of being about a third of the total length of the cover portion 14 and a total width of the cover portion 14 as shown here (see, for example, FIG. 8). As noted above, the hinge 40 connects one of the three sidewalls (here, sidewall 44b) to the frame 34 (here, at side 36d). A closure portion 46a (FIG. 3) is located on at least one of the remaining sidewalls 44a of the at least three sidewalls of the access door 30. The closure portion 46a is configured to connect with a mating closure portion 48a located on one of the generally vertically oriented sides (here, side 36a) of the frame 34. (Although not shown in FIGS. 3 and 4, another identical closure portion 46b is shown on the sidewall 44c of the access door 30 in FIG. 2, which closure portion 46b interacts with a similar mating closure portion on side 36c of the frame 34.) The closure portions 46a, 48a are configured as a catch and tongue, respectively, but other known closures could be used.

Figure 5:
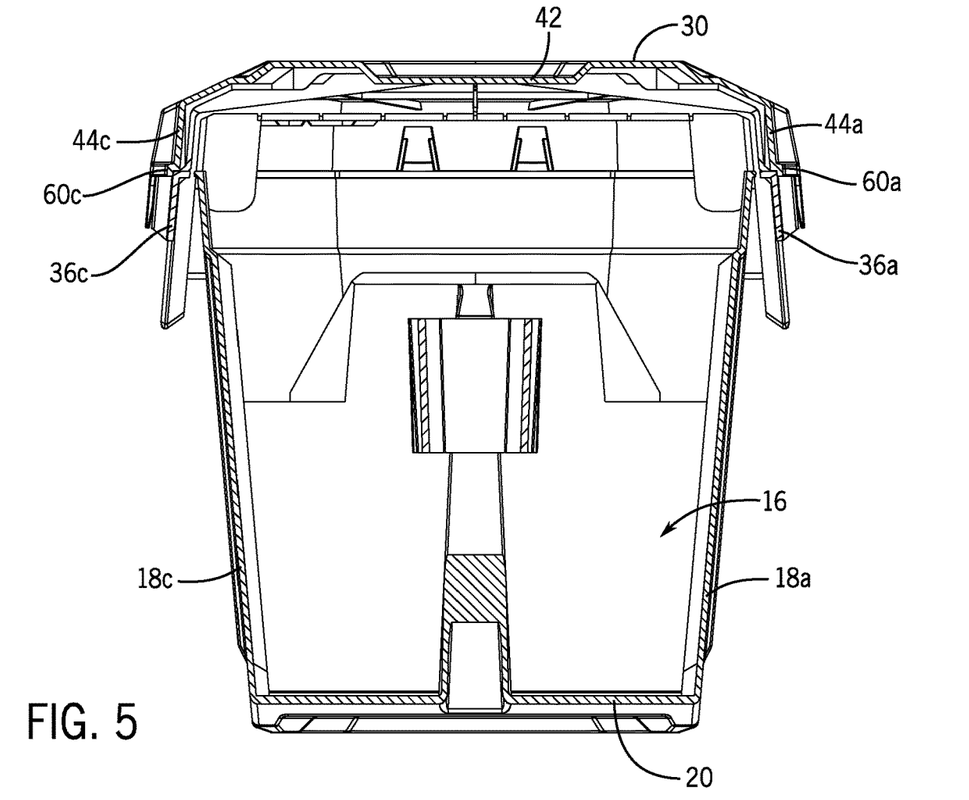
FIG. 5 is a cross section of the container taken along the line V-V in FIG. 3.
Figure 6:
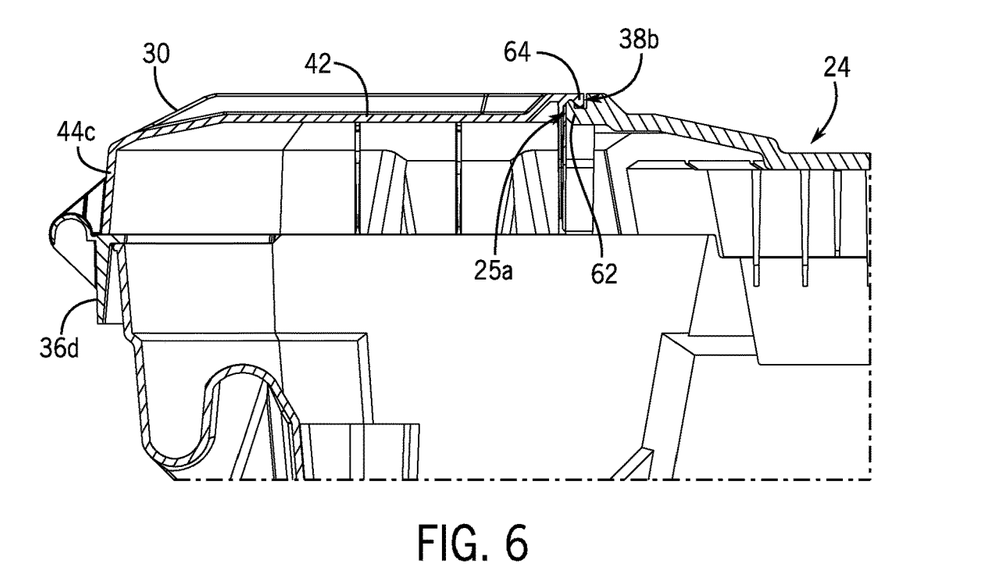
FIG. 6 is a cross section taken along the line VI-VI in FIG. 3.

As noted herein above, and as shown in FIGS. 2-4, both of the end sections 26, 28 comprise an access door 30, 32, respectively. Each of the first and second access doors 30, 32 extends from the first side 36a of the frame 34 to the second side 36c of the frame 34. Each of the first and second access doors 30, 32 has an upper side (the access door 30 has above-noted upper side 42, and the access door 32 has upper side 50) and at least three sidewalls (access door 30 has sidewalls 44a-c, and access door 32 has side walls 52a-c) that extend generally perpendicularly from the respective upper side 42, 50 and are configured to align with the generally vertically oriented outer faces of the first and second sides 36a, 36c of the frame 34 and of one of the third and fourth sides 36d, 36b of the frame 34, respectively, when the respective access door 30, 32 is in a closed configuration. (By "generally vertically" or "generally perpendicularly," it is meant to include angles from 70-110 degrees.) For example, as shown in FIG. 5, sidewall 44a of access door 30 aligns with side 36a of the frame 34, and sidewall 44c of access door 30 aligns with side 36c of the frame 34. As shown in FIG. 6, sidewall 44c of the access door 30 aligns with side 36d of the frame 34.

Each of the first and second access doors 30, 32 further comprises a hinge (access door 30 has hinge 40 and access door 32 has hinge 54) on one of the sidewalls 44b, 52b thereof, the hinge 40, 54 providing the pivotable connection between the first or second access door 30, 32 and the third or fourth side 36d, 36b of the frame 34, respectively. Each of the first and second access doors 30, 32 further comprises a closure portion (access door 30 has closure portions 46a, 46b, and access door 32 has closure portions 56a, 56b) on at least one of the sidewalls thereof. The frame 34 comprises mating closure portions 48a, 58a configured to connect with the closure portions 46a, 56a on the sidewalls 44a, 52a of the first and second access doors 30, 32, respectively, to hold the access doors 30, 32 in the closed configuration. (Note that closure portions 46b, 56b interact with closure portions on the opposite side 36c of the frame 34 that are similar to those shown at 48a, 58a.) When the access doors 30, 32 are both in the closed configuration, as shown in FIG. 3, the access doors 30, 32 and middle cover section 24 are together configured to enclose the interior space 16 between the cover portion 14 and the lower portion (box) 12.

As shown in FIG. 5, each of the first and second access doors 30, 32 further comprises a lip on at least one of the sidewalls thereof. Here, the lips 60a, 60c on sidewalls 44a, 44c of access door 30 are shown; however, similar lips exist on sidewalls 52a, 52c of access door 32. The lips 60a, 60c overhang the generally vertically oriented outer face of the first, second, third, or fourth side 36a-d of the frame 34 above which the lips 60a, 60c are located when the respective access door 30 (or 32) is in the closed configuration. For example, as shown in FIG. 5, the lip 60a overhangs the outer face of side 36a of the frame 34, while the lip 60c overhangs the outer face of side 36c of the frame 34. As shown in FIG. 6, the middle cover section 24 has lips on opposing sides thereof that are not connected to the frame 34. Only lip 62 is shown on one side 25a of the middle cover section 24, but a mirror image lip is provided on the other side 25b (FIG. 2) of the middle cover section 24. Each of the first and second access doors 30, 32 has a lip on a side thereof that is opposite the side along which the access door 30, 32 is pivotably connected to the frame 34. Here, only lip 64 is shown on side 38b of access door 30, but a mirror image lip exists on the corresponding side of access door 32. The lip 64 on the access door 30 is configured to overlap the lip 62 on the middle cover section 24 in a watertight manner when the access door 30 is in the closed configuration. The lips 60a, 60c, 62, and 64 ensure a watertight interface between the access doors 30, 32, the middle section 24, and the frame 34 when the access doors 30, 32 are in the closed configuration.

Figure 7:
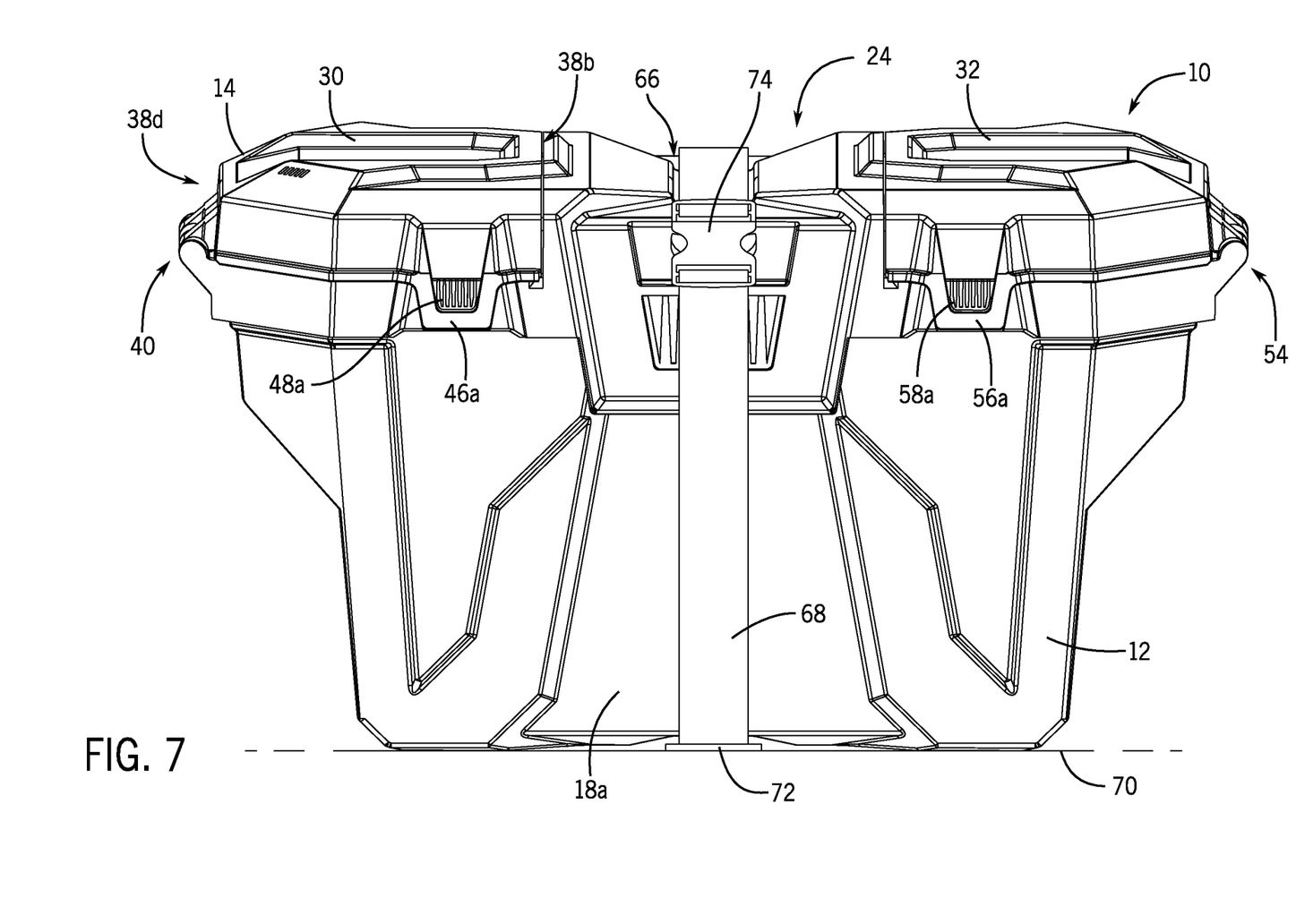
FIG. 7 shows the container strapped to a supporting surface.

As shown in FIG. 7, the middle section 24 comprises a channel 66 (see also FIG. 2) extending across the width of the cover portion 14. The channel 66 is configured to receive a strap 68 for attaching the container 10 to a supporting surface 70, such as a deck of a trailer or boat. For example, the strap 68 can be removably or permanently connected to a bracket 72 that is connected to the supporting surface 70. A user can place the container 10 on the supporting surface 70 over the unfastened strap 68 and the bracket 72, then pull the two sides of the unfastened strap 68 up along the sides 18a and 18c of the lower portion 12, then fasten the two sides of the strap 68 together using a fastener 74. The user can pull the loose end of the strap 68 tight while arranging the strap 68 within the channel 66 on the middle section 24 of the cover portion 14. Because the strap 68 is connected to the supporting surface 70 via the bracket 72, the fastened strap 68 will hold the container 10 in place on the supporting surface 70.

In a prior art battery box with a single-member cover having no access doors, if the user had secured the battery box to the supporting surface 70 in the above-noted manner, the user would need to unfasten the strap 68 before the user could remove the cover to access the terminals on the battery therein, such as to charge the battery or connect additional peripheral components thereto. In prior art designs for battery boxes with external terminals, the user would not need to remove the strap 68 to access the terminals; however, battery boxes with external terminals are costly due to the additional components required for connecting the battery's terminals to the external terminals on the battery box. In the present design, the user can open the access doors 30, 32 to access the battery's terminals without needing to unfasten the strap 68. Furthermore, because external electrical terminals are not required, the cost and complexity involved with providing same is avoided. At the same time, the design of the cover portion 14 is watertight at junctions between the access doors 30, 32 and the frame 34 and at junctions between the access doors 30, 32 and the middle section 24.

FIG. 8 shows another embodiment of a container 810 for a marine battery. The container 810 has a lower portion (box) 812 and a cover portion 814. A frame 834 is configured to be supported about an upper perimeter of the box 812 and secured thereto. Note that the container 810 in this example is rectangular; the container 10 of FIGS. 1-7 could have a similar rectangular shape. Alternatively, the container 810 in FIG. 8 could have a shape similar to that of the container 10 in FIGS. 1-7. A middle cover section 824 extends from a first side 836a of the frame 834 to a second side (not shown) of the frame 834, opposite the first side 836a. A first access door 830 is pivotably connected to a third side 836d of the frame 834, and a second access door 832 is pivotably connected to a fourth side (not shown) of the frame 834, opposite the third side 836d. Each of the first and second access doors 830, 832 comprises a hinge on one of the sidewalls thereof, the hinge providing the pivotable connection between the first or second access door 830, 832 and the third or fourth side of the frame 834, respectively. Here, only the hinge 840 is shown on the sidewall 844b of access door 830; however, a similar hinge is located on the outer sidewall of access door 832. Opposite hinged side 838d of access door 830, side 838b is separable from middle cover section 824. Side 838c is also separable from the remainder of the cover portion 814, such that access door 830 can be pivoted upwardly from the middle cover section 824 to provide access to the terminal on the battery in the interior of the container 810. Access door is 832 is similarly designed to provide access to the opposite terminal.

Note that in this example, the access doors 830, 832 do not extend across the entire width of the container 810, which is not strictly necessary as battery terminals are generally located more toward one edge of the battery than the other. As long as the user places the cover portion 814 over the battery with the access doors 830, 832 aligned over the terminals, the terminals will be accessible. The middle cover section 824 may be provided with a channel like that shown at 66 in the embodiment of FIGS. 1-7 for locating a tie-down strap 68, although such a channel is not shown herein.

When the access doors 830, 832 are in a closed configuration, the access doors 830, 832 and middle cover section 824 are together configured to enclose the interior space between the cover portion 814 and the box 812. The access doors 830, 832 and frame 834 can be provided with closures like those shown at 46a, 48a, 56a, 58a in the embodiment of FIGS. 1-7 to maintain the access doors 830, 832 securely in the closed configuration, although such closures are not shown herein.

FIG. 9 shows another embodiment of a container 910 for a marine battery. The container 910 has a lower portion (box) 912 and a cover portion 914. A frame 934 is configured to be supported about an upper perimeter of the box 912 and secured thereto. Note that the container 910 in this example is rectangular; alternatively, the container 910 in FIG. 9 could have a shape similar to that of the container 10 in FIGS. 1-7. A middle cover section 924 extends from a first side 936a of the frame 934 to a second side (not shown) of the frame 934, opposite the first side 936a. A first access door 930 is pivotably connected to a first side 925a of the middle cover section 924, and a second access door 932 is pivotably connected to a second side 925b of the middle cover section 924. Each of the first and second access doors 930, 932 comprises a hinge 940, 954 on one of the sides thereof. Here, the hinges 940, 954 provide the pivotable connections between the respective first or second access door 930, 932 and the middle cover section 924. Opposite hinged side 938b of access door 930, side 938d is separable from side 936d of the frame 934. Side 938a and opposite side (not shown) are also separable from the remainder of the cover portion 914, such that access door 930 can be pivoted upwardly away from the frame 934 to provide access to the terminal on the battery in the interior of the container 910. Access door is 932 is similarly designed to provide access to the opposite terminal.

Thus, the present disclosure is of a marine battery box 12, 812, 912 with a cover portion 14, 814, 914 that has access doors 30, 32, 830, 832, 930, 932 allowing access to the terminals on opposite ends of the battery to be stored in the box. When the access doors 30, 32, 830, 832, 930, 932 are in a closed configuration, the junctions between the access doors 30, 32, 830, 832, 930, 932 and a middle section 24, 824, 924 of the cover portion 14, 814, 914 are watertight to protect the battery from moisture. The middle section 24, 824, 924 of the cover portion 14, 814, 914 provides a place to secure a tie-down strap 68 that holds the battery box to a supporting surface, while the access doors 30, 32, 830, 832, 930, 932 allow access to the terminals even while the strap 68 remains in place across the width of the battery box.

In the present description, certain terms have been used for brevity, clarity, and understanding. No unnecessary limitations are to be implied therefrom beyond the requirement of the prior art because such terms are used for descriptive purposes only and are intended to be broadly construed. The different components and assemblies described herein may be used or sold separately or in combination with other components and assemblies. Various equivalents, alternatives, and modifications are possible within the scope of the appended claims.

What is claimed is:

1. A container for a marine battery, the container having:
   a lower portion configured to support the marine battery; and
   a cover portion over the lower portion, the cover portion and lower portion together enclosing an interior space configured to hold the marine battery;
   wherein the cover portion has a middle section and two end sections on either side of the middle section;
   wherein at least one of the end sections comprises an access door that is movable independently of the middle section so as to provide access to the interior space, while the middle section remains stationary with respect to the lower portion;
   wherein the cover portion comprises a frame configured to be supported about an upper perimeter of the lower portion of the container, and wherein the middle section of the cover portion is permanently connected to the frame; and
   wherein the entire cover portion, including the middle section, the two end sections, and the frame, is configured to be removed, as a unit, from the lower portion of the container.

2. The container of claim 1, wherein the access door has at least two sides that are configured to separate from the frame of the cover portion when the access door is moved to provide access to the interior space.

3. The container of claim 2, further comprising a hinge connecting a remaining side of the access door to the frame, the hinge allowing the at least two sides of the access door to be pivoted away from the frame to provide access to the interior space.

4. The container of claim 3, wherein the hinge is located at an outer end of the cover portion.

5. The container of claim 1, wherein the access door has an upper side and at least three sidewalls that extend generally perpendicularly from the upper side and align with generally vertically oriented sides of the frame.

6. The container of claim 5, further comprising:
   a hinge connecting one of the at least three sidewalls to the frame; and
   a closure portion located on at least one of the remaining sidewalls of the at least three sidewalls, the closure portion configured to connect with a mating closure portion located on one of the generally vertically oriented sides of the frame.

7. The container of claim 1, wherein the middle section has a length that is a third of a total length of the cover portion.

8. The container of claim 7, wherein the middle section comprises a channel extending across a width of the cover portion, the channel configured to receive a strap for attaching the container to a supporting surface.

9. The container of claim 1, wherein the access door extends across an entire width of the cover portion.

10. The container of claim 1, wherein both of the end sections comprise the access door.

11. A cover for a marine battery box, the cover comprising:
    a frame configured to be supported about and removably secured to an upper perimeter of the box, the frame having vertically oriented sides that extend along and overlap respective vertically oriented sides of the box;
    a middle cover section extending from a first side of the frame to a second side of the frame, opposite the first side;
    a first access door pivotably connected to a third side of the frame; and
    a second access door pivotably connected to a fourth side of the frame, opposite the third side;
    wherein when the access doors are in a closed configuration, the access doors and middle cover section are together configured to enclose an interior space between the cover and the box;
    wherein the middle cover section is permanently connected to the first and second sides of the frame; and
    wherein the entire cover, including the frame, the middle cover section, and the first and second access doors, is configured to be removed, as a unit, from the box.

12. The cover of claim 11, wherein the first, second, third, and fourth sides of the frame have generally vertically oriented outer faces; and
    wherein each of the first and second access doors has an upper side and at least three sidewalls that extend generally perpendicularly from the upper side and are configured to align with the generally vertically oriented outer faces of the first and second sides of the frame and of one of the third and fourth sides of the frame, respectively, when the respective access door is in the closed configuration.

13. The cover of claim 12, wherein each of the first and second access doors further comprises a hinge on one of the sidewalls thereof, the hinge providing the pivotable connection between the first or second access door and the third or fourth side of the frame, respectively.

14. The cover of claim 12, wherein each of the first and second access doors further comprises a closure portion on at least one of the sidewalls thereof, and wherein the frame comprises mating closure portions configured to connect with the closure portions on the sidewalls of the first and second access doors, respectively, to hold the access doors in the closed configuration.

15. The cover of claim 12, wherein each of the first and second access doors further comprises a lip on at least one of the sidewalls thereof that overhangs the generally vertically oriented outer face of the first, second, third, or fourth side of the frame above which the lip is located when the respective access door is in the closed configuration.

16. The cover of claim 11, wherein the middle cover section has lips on opposing sides thereof that are not connected to the frame, and wherein each of the first and second access doors has a lip on a side thereof that is opposite a side along which the access door is pivotably connected to the frame, the lip on each access door being configured to overlap a respective one of the lips on the middle cover section in a watertight manner when the respective access door is in the closed configuration.

17. The cover of claim 11, wherein each of the first and second access doors extends from the first side of the frame to the second side of the frame.

18. The container of claim 1, wherein the middle section of the cover portion is configured to be parallel with a supporting surface on which the container is configured to be placed while in use.

19. The cover of claim 11, wherein, when the frame is secured to the upper perimeter of the box, the middle cover section is configured to be parallel with a supporting surface on which the box is configured to be placed while in use.

20. A container for a marine battery, the container having:
a lower portion configured to support the marine battery, the lower portion having a plurality of main sides that terminate at an upper perimeter; and
a cover portion covering the upper perimeter of the lower portion such that the cover portion and lower portion together enclose an interior space configured to hold the marine battery, the cover portion having a frame, a middle section spanning from a first side of the frame to an opposite second side of the frame, and two end sections on either side of the middle section;
wherein the entire cover portion, including the frame, the middle section, and the two end sections, is configured to removed, as a unit, from the lower portion of the container so as to allow the marine battery to be placed in the interior space; and
wherein at least one of the two end sections comprises an access door that is movable independently of the middle section so as to provide access to a terminal of the marine battery held within the interior space, while the middle section remains stationary with respect to the lower portion.

* * * * *